Figure 1:
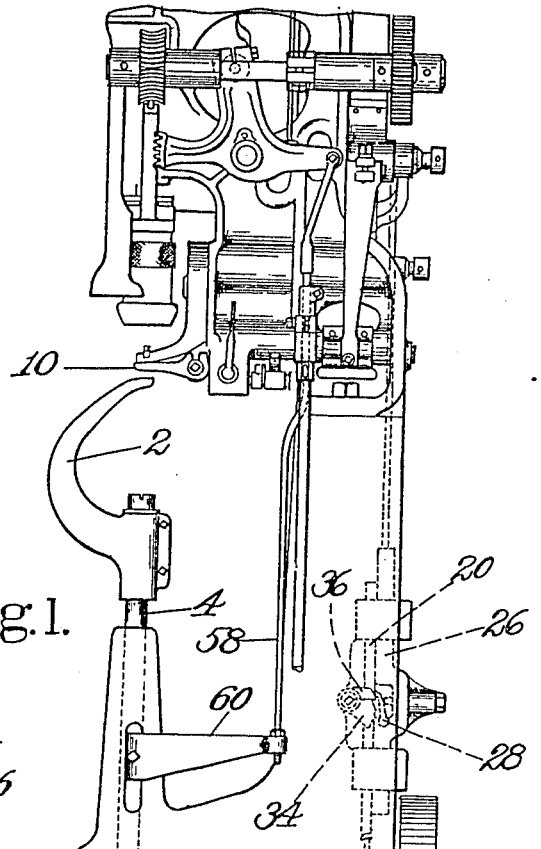

G. A. AMBLER.
WORK SUPPORT CONTROLLING MECHANISM.
APPLICATION FILED FEB. 16, 1910.

1,005,921.

Patented Oct. 17, 1911.

WITNESSES.
Elizabeth C. Coupe
Edith C. Holbrook

INVENTOR.
George A. Ambler
By his Attorney,
Nelson W. Howard

UNITED STATES PATENT OFFICE.

GEORGE A. AMBLER, OF WINCHESTER, MASSACHUSETTS, ASSIGNOR TO UNITED SHOE MACHINERY COMPANY, OF PATERSON, NEW JERSEY, A CORPORATION OF NEW JERSEY.

WORK-SUPPORT-CONTROLLING MECHANISM.

1,005,921.   Specification of Letters Patent.   Patented Oct. 17, 1911.

Application filed February 16, 1910. Serial No. 544,320.

*To all whom it may concern:*

Be it known that I, GEORGE A. AMBLER, a citizen of the United States, residing at Winchester, in the county of Middlesex and State of Massachusetts, have invented certain Improvements in Work-Support-Controlling Mechanisms, of which the following description, in connection with the accompanying drawings, is a specification, like reference characters on the drawings indicating like parts in the several figures.

This invention relates to mechanisms for controlling the operation of work supports, the invention being especially applicable to work supports of the type employed in machines for inserting fastenings into the heels or soles of boots and shoes.

In those fastening inserting machines which operate to insert the fastenings successively, the operation of the work support is usually so controlled that the work is clamped between the work support and a work abutment adjacent to the fastening inserting mechanism at the time the fastening is inserted, and that when the work is to be fed into position to receive the succeeding fastening a relative movement of the work abutment and the work support is effected such that the clamping pressure will be removed from the work to permit it to be fed without hindrance.

In some of the fastening inserting operations practiced in the manufacture of the various types of shoes, it is important that the length of the fastening be proportioned to the thickness of the part into which it is to be inserted, and various mechanisms are provided for effecting automatically this determination, the particular mechanism employed depending, for the most part, upon the kind of fastening which is being inserted. Since, in most cases, the thickness of the work is normally gaged between the work abutment and the work support at the time the fastening is inserted or just before the work is to be fed, these mechanisms usually comprise means controlled by the relative positions of the work support and the work abutment for different thicknesses of the work either to select automatically from a plurality of lengths of previously formed fastenings a fastening of the length suited to the thickness of the work into which it is to be inserted or for forming from a strip of fastening material a fastening of the required length. In either case it will be noted that it is important that the work support and work abutment be in proper gaging relation to each other at the time the fastening length selecting mechanism operates, if the selection is to be accurate.

When the machine operates at high speed it has been found that with the most of the work support controlling mechanisms hitherto employed the relative movement of the work support and work abutment does not take place quickly enough to bring these parts into their proper gaging relation to the work in time for the fastening selecting operation.

It will be apparent upon a consideration of the problem presented by the defect in the operation of previous constructions just noted, that the most serious result of the failure of the work support and work abutment to properly gage the work will be the provision of a fastening which is too long when the work has been fed to bring a thinner portion into position to receive a fastening after a fastening has been inserted in the thicker portion preceding it. When this occurs, one end of the fastening will be left projecting beyond the surface of the work unless the fastening is of the type which is to be clenched, and in any event the operation of the machine will not be as satisfactory as it would be if the length of the fastening were accurately gaged.

One type of work support controlling mechanism which has been found defective in its operation in the respect above noted is that in which the work support is moved into and maintained in work clamping position by a comparatively strong spring. In this type of work support controlling mechanism means is usually provided, comprising work thickness compensating mechanism, which serves to depress the work against the tension of its supporting spring for the work feeding operation. The work thickness compensating mechanism comprises usually means for locking together, at a fixed point in the movement of one of them, two relatively movable parts, the movement of one of the parts being of determined extent and the position of the other part at the time the locking operation takes place varying in accordance with the variations in the thickness of the work.

In mechanisms of the type just referred to the unlocking operation takes place at the same point in the path of movement of the part having the determined extent of movement at which the locking operation takes place. The spring is therefore not free to move the work support into the new clamping position required by a change in the thickness of the work until the unlocking operation takes place.

As hereinabove suggested, it has been found that the length of the fastening gaged by a work support, the movements of which have been controlled by mechanism of the type just described, has usually been too great when the machine is operating at high speed and the work has been moved to bring a thinner part into position to be operated upon after a thick part has been operated upon.

An object of this invention is to overcome this defect in the operation of machines employing work support controlling mechanism of this type, and to this end means is provided for causing the unlocking operation to take place before the part having the determined extent of movement reaches, in its return movement, the point at which the locking operation took place.

Other objects and features of the invention will be apparent upon consideration of the following description and claims in connection with the accompanying drawings, which illustrate a preferred embodiment of the invention, and in which,—

Figure 2:
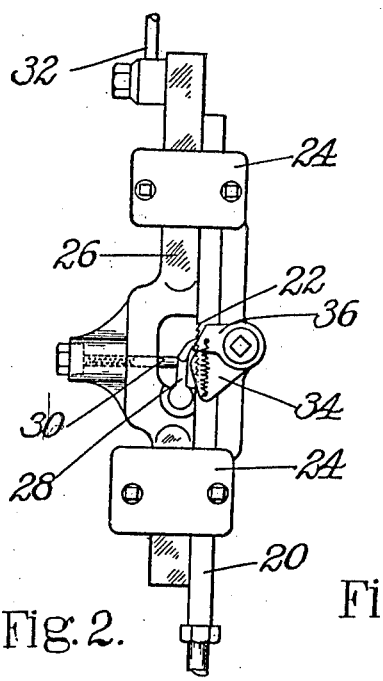
Figure 3:
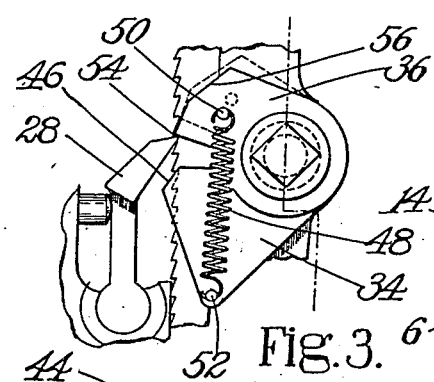
Figure 4:
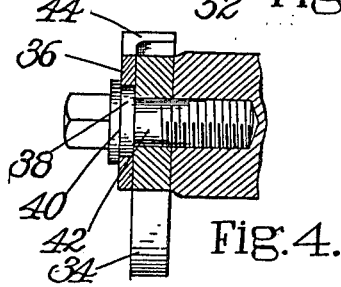

Figure 1 is a side elevation of a machine for inserting fastenings embodying this invention, parts of the machine which are not essential to an understanding of the invention being omitted from the showing; Fig. 2 is a side elevation of the locking means constituting a part of the work support controlling mechanism, this means being viewed from the side of the machine opposite to that shown in Fig. 1; Fig. 3 is an enlarged detail of the locking means shown in Fig. 2 showing the pivoted pawl tripping cam block engaged and lifted by the pawl; Fig. 4 is a section through the two pawl tripping cam blocks.

The machine in which the invention is shown as embodied is the well-known standard screw machine, this machine being illustrated more fully in United States Patents Nos. 490,621 and 490,622 to L. Goddu, dated January 24, 1893, to which patents reference may be had for a fuller understanding of the details of construction and operation of the machine. The work support controlling mechanism or horn release mechanism is of the type disclosed in United States Letters Patent No. 786,190 to L. A. Casgrain, granted March 28, 1905, attention being called especially to Fig. 2 of this patent.

The work into which the fastenings are to be inserted is supported upon a horn 2 carried by a vertically movable shaft 4 supported upon a spring 6 which rests in a socket 8 in the base of the machine, the spring 6 being so tensioned that it tends normally to cause the horn to press the work against the work abutment 10 adjacent to the fastening inserting mechanism.

The spring 6 surrounds a rod 12 threaded into the lower end of the horn shaft 4 and provided with an adjustable collar 14 against which the upper end of the spring bears. The rod 12 at its lower end is pivotally connected with a lever 15 fulcrumed at 16 in the base of the machine, the other arm of the lever 15 being pivotally connected to a rod 18 which carries at its upper end a slide 20 provided with ratchet teeth 22, the slide 20 being arranged to slide in guides 24. A second slide 26 also arranged to slide in the guides 24 carries a pawl 28 engaged and pressed by a spring plunger 30 normally into engagement with one of the ratchet teeth 22 upon the slide 20. The slide 26 is connected by a rod 32 to suitable operating means by which it is reciprocated after each fastening inserting operation to cause the horn 2 to be depressed, in a manner hereinafter to be described, to permit the work to be fed. In order that the horn 2 may adjust itself to the different thicknesses of the work and that the amount of horn releasing movement may be the same from each of the adjusted positions of the horn, means is provided for moving the pawl 28 out of engagement with the ratchet teeth on the slide 20 when the slide 26 is moving down and for maintaining the pawl out of engagement with the ratchet teeth until the slide 20 has adjusted itself to the new position of the horn required by any variation in the thickness of the work. The slide 20 being positively connected with the horn its adjustment will, of course, be effected by the action of the spring 6.

The means for tripping the pawl for the purposes above specified may comprise a cam block 34 of substantially the construction disclosed in the Patent No. 786,190 above referred to. With the construction thus far described it will be seen that the locking of the slide 26 to the slide 20, to cause the horn to be depressed by the connections between the slide 20 and the horn as the slide 26 is raised through its connection with the power-operated means hereinabove referred to, will take place at the same point in the path of reciprocation of the slide 26 at which the unlocking operation took place; that is, the cam block 34 will permit the pawl 28 to move again into engagement with the ratchet teeth 22 of the slide 20 at the same point in the upward movement of the slide 26 at which said cam block moves the pawl 28 out of engagement with the ratchet teeth in the downward movement of the slide 26.

As hereinabove suggested, it has been found in operation that when the machine is running at comparatively high speed the spring 6 will not have time enough to move the horn 2 into proper work thickness gaging relation to the work abutment 10 for marked decreases in the thickness of the work, if the release of the slide 20 is delayed until the slide 26 reaches the same point in its downward movement at which the slide 20 was locked to it in its upward movement. It has been proposed to release the slide 20 at the end of its horn depressing movement, but this puts a needless strain upon the machine, especially if the horn supporting spring is strong enough to support the work for the fastening inserting operation. Therefore, in order to give the spring 6 time enough to return the horn to its proper work gaging position and at the same time to avoid jarring the machine and putting it under severe strain in various parts, means is provided in the illustrated construction for tripping the pawl at a point in its return movement in advance of the point at which it was moved into locking position in its horn release movement. The illustrated means comprises a second pawl tripping cam block 36 pivotally mounted upon a bearing 38 formed between a shoulder 40 upon the head of the set screw 42, by which the cam block 34 is confined upon the machine frame, and the face of said cam block 34. The cam block 36 has a flanged portion 44 overlying the pawl engaging edge 46 of the cam block 34 and arranged to engage and be stopped by said edge when in its lowermost position. A spring 48 connected at one end to a pin 50 upon the cam block 36 and at its other end to a pin 52 upon the cam block 34 maintains the cam block normally in its lowermost position. The flange 44 at its lower end forms a lip 54 arranged to be engaged by the pawl 28, as it slides over the pawl engaging edge 46 of the cam block 34 into engagement with the ratchet teeth 22 on the slide 20, upon the upward movement of the slide 26. The cam block 36 is thus caused to turn about its bearing 38 upon the set screw 42 as the slide 26 moves upwardly, and the extent of movement of the slide 26 and the radius of the arc of movement of the cam block 36 are so proportioned that the pawl 28 will move out of engagement with the lip 54 before the slide 26 reaches the upper limit of its movement, and the cam block 36 will therefore be moved back into its lowermost position by the spring 48. This brings the cam block 36 into such position that upon the downward movement of the slide 26 the pawl engaging edge 56 of the cam block 36 will engage and trip the pawl 28 before it reaches the point in the path of reciprocation of the slide 26 at which it is moved into engagement with the teeth 22. The spring 6 will thus be permitted to return the horn 2 into its work gaging position earlier than would otherwise be the case.

In the machine illustrated the measuring rod 58 which constitutes an adjustable abutment for the fastening length determining mechanism is carried by an arm 60 attached to the horn shaft 4, this mechanism being more fully described in the Patents Nos. 490,621 and 490,622 above referred to. It will therefore be seen that it is important that the horn 2 come into work gaging position at the right time in order properly to position the measuring rod 58 for the fastening length determining operation.

Having described my invention, what I claim as new and desire to secure by Letters Patent of the United States is:—

1. In a machine of the class described, a work support, a spring arranged to maintain said work support normally in work clamping position, means for depressing said work support to permit the work to be fed thereover, comprising work thickness compensating mechanism, and means for causing the work support to be restored to the action of the spring at a point between its extreme depression and the position from which it has been depressed.

2. In a machine of the class described, a work support, a spring arranged to maintain said work support normally in work clamping position, means for intermittently depressing said work support, comprising relatively movable parts, one of said parts being connected with a source of power and the other with said work support, means for locking said parts together to move together, and means rendered operative by the movement of said parts together in one direction for unlocking said parts at a point in the path of movement in the other direction other than that at which they were locked together, the operation of said means being independent of the thickness of the work.

3. Work support operating mechanism, comprising in combination, a reciprocating part having a uniform extent of movement, a work support, a part connected with the work support and arranged to be locked to said reciprocating part in different relative positions of said parts, means for locking said parts together for movement together at one point in the path of reciprocating movement of said reciprocating part and means for unlocking said parts at a different point upon the return movement of said parts.

4. Work support operating mechanism, having in combination, a work support, a spring for maintaining said work support normally in work clamping position, means for depressing said support against the tension of said spring, comprising a normally reciprocating slide, a second slide connected to the work support, means for locking said slides together to cause them to reciprocate together constructed to move into locking position at one point in the path of reciprocation of said first mentioned slide upon the movement of said slide in one direction and to be moved out of locking position at a different point in said path upon the return movement of said slide, the operation of said means being independent of the thickness of the work.

5. In a machine of the class described, a work support yieldingly maintained normally in work clamping position, means for depressing said work support, comprising relatively movable slides, one of which is connected to a source of power and the other to the work support, a pawl carried by one of said slides, the other of said slides being provided with coöperating ratchet teeth, means for maintaining said pawl out of engagement with said ratchet teeth to permit the adjustment of the work support to the thickness of the work, constructed to permit said pawl to be moved into engagement with said teeth at a fixed point in the path of movement of the slide which is connected with the source of power, and means for disengaging said pawl from said ratchet teeth arranged to operate at a point in the return movement of the slide connected with the source of power in advance of the said fixed point.

6. In a machine of the class described, a work support, a spring arranged to maintain said work support normally in work clamping position, means for depressing said work support to permit the work to be fed thereover, comprising a normally reciprocated pawl carrying slide, a second slide connected with the work support and provided with ratchet teeth, a pawl carried by said first mentioned slide and arranged to engage the ratchet teeth and lock said slides together to depress the work support against the tension of its spring and a pivoted cam block for moving said pawl out of locking position upon the return movement of said slides arranged to be engaged and moved into inoperative position upon the work depressing movement of said slides.

7. In a machine of the class described, a work support, a spring arranged to maintain said work support normally in work clamping position, means for depressing said work support to permit the work to be fed thereover comprising a normally reciprocated pawl carrying slide, a second slide connected with the work support and arranged to be locked to said first mentioned slide to depress the work support, means for locking said slides together comprising a pawl carried by the first mentioned slide and arranged to engage ratchet teeth formed on the second slide, a stationary cam block arranged to maintain said pawl out of operative position during a portion of the movement of said pawl carrying slide in both directions, a movable pawl tripping cam block arranged to be engaged by said pawl during the work depressing movement of said pawl carrying slide and moved out of operative position, and means for automatically restoring said movable cam block to its operative position before the return movement of said slide whereby said pawl is tripped before it comes into the field of operation of the stationary cam block.

In testimony whereof I have signed my name to this specification in the presence of two subscribing witnesses.

GEORGE A. AMBLER.

Witnesses:
JOHN H. MCCREADY,
LEONARD M. JOHNSON.